United States Patent [19]
Sbisa

[11] Patent Number: 6,097,803
[45] Date of Patent: Aug. 1, 2000

[54] POTS NUMBER PROCESSING USING A SERVICE CONTROL POINT

[75] Inventor: Daniel Charles Sbisa, Blue Springs, Mo.

[73] Assignee: Sprint Communications Company, L.P., Kansas City, Mo.

[21] Appl. No.: 08/988,909

[22] Filed: Dec. 11, 1997

Related U.S. Application Data

[63] Continuation-in-part of application No. 08/388,786, Feb. 15, 1995, Pat. No. 5,694,463.

[51] Int. Cl.[7] .................................................... H04M 3/42
[52] U.S. Cl. .......................... 379/230; 379/219; 379/221; 379/211; 379/207
[58] Field of Search ................................. 379/211, 219, 379/220, 221, 229, 230, 207

[56] References Cited

U.S. PATENT DOCUMENTS

| | | | |
|---|---|---|---|
| 5,694,463 | 12/1997 | Christie et al. | 379/230 |
| 5,881,145 | 3/1999 | Giuhat et al. | 379/207 |
| 5,883,950 | 3/1999 | Sonnenberg | 379/207 |
| 5,889,846 | 3/1999 | Ricciardi | 379/207 |
| 5,889,848 | 3/1999 | Cookson | 379/207 |
| 5,910,981 | 6/1999 | Bhagat et al. | 379/207 |
| 5,915,009 | 6/1999 | Williams et al. | 379/230 |
| 5,917,899 | 6/1999 | Moss et al. | 379/230 |

*Primary Examiner*—Krista Zele
*Assistant Examiner*—William J. Deane, Jr.
*Attorney, Agent, or Firm*—Harley R. Ball

[57] ABSTRACT

The invention is a method and system for processing POTS numbers in an SCP. A telecommunications switch receives the call and a set-up message for the call. The telecommunications switch then transmits a message to the SCP for the call. In response to the message, the SCP processes a POTS number to select a telecommunications switch and a connection for the call. The SCP then transmits a message to the switch that identifies the selected telecommunications switch and the selected connection. The telecommunications switch then extends the call in response to the message from the SCP. The telecommunications switch does not need to translate the POTS number or a Location Routing Number to extend the call.

51 Claims, 6 Drawing Sheets

POTS NUMBER PROCESSING USING A SERVICE CONTROL POINT

RELATED APPLICATION

This patent application is a continuation-in-part of U.S. patent application Ser. No. 08/388,786 filed Feb. 15, 1995 which issued as U.S. Pat. No. 5,694,463 on Dec. 2, 1997, and which is incorporated by reference into this Patent Application.

FIELD OF THE INVENTION

The invention is related to the field of telecommunications, and in particular, to the use of Service Control Points (SCPs) to process Plain Old Telephone Service (POTS) numbers for calls placed to a telecommunications switch.

BACKGROUND OF THE INVENTION

Standard ten-digit telephone numbers with an area code and exchange are referred to in the art as Plain Old Telephone Service (POTS) numbers. Telecommunications switches are loaded with logic to process POTS numbers. POTS number processing entails translating the POTS number into a connection for the call. Translating a ten-digit number is an intricate process that requires a series of table look-ups to match subsets of the digits. POTS number processing logic is typically complex and proprietary to the switch supplier. The owner of a telecommunications switch must often rely on the switch supplier to modify the POTS number processing logic. This reliance can be time-consuming and costly.

For special service calls, a Service Control Point (SCP) is used to assist the telecommunications switch. A prime example is an "800" type call. A typical telecommunications switch does not have the call processing logic to handle "800" type calls. As a result, the telecommunications switch queries the SCP with the "800" type number, and the SCP responds to the switch with a POTS number. The switch can then process the POTS number with its own POTS number processing logic.

Telecommunications switches use SCPs to support Line Number Portability (LNP). An originating telecommunications switch initially receives the call and queries the SCP if the call is placed to a POTS number with a portable area code and exchange. If the POTS number has been ported to a new terminating switch, then the SCP returns a ten-digit Location Routing Number (LRN) that identifies the new terminating switch. The originating switch and subsequent tandem switches must translate the ten-digit LRN into connections that establish a call path to the new terminating switch. The new terminating switch translates originally called POTS number into a connection to the called party.

In an LNP scenario, the SCP does not select connections for the switches. Unfortunately, the switches are still required to translate a ten digit LRN to identify connections for the call. Translating a ten-digit number is an intricate process that requires a series of table look-ups to match subsets of the digits. The logic required to translate a ten-digit LNR is similar in complexity to the logic required to translate a ten-digit POTS number.

Telecommunications switches do not use SCPs to process POTS numbers and select the switches and connections that can be used to extend a call. Telecommunications switches make these selections with their own POTS number processing logic. There is a need for a more efficient and cost-effective way to process POTS numbers.

SUMMARY OF THE INVENTION

An embodiment of the invention includes a method of processing a Plain Old Telephone Service (POTS) number for a call using a processing system. The method comprises receiving the call and a set-up message for the call into a first telecommunications switch, generating an query message for the call in response to receiving the set-up message transmitting the query message from the first telecommunications switch and receiving the query message into the processing system. The processor processes the POTS number for the call to determine a selected telecommunications switch and a selected connection in response to receiving the query message and the processor generates a response message for the call that identifies the selected telecommunications switch and the selected connection. The response message is transmitted to the first telecommunications switch and the first telecommunications switch extends the call in response to receiving the response message.

The invention also comprises a method of processing a Plain Old Telephone Service (POTS) number for a call using a Service Control Point (SCP), wherein a first telecommunications switch receives the call and a set-up message for the call, and the first telecommunications switch generates an SCP query message for the call in response to receiving the set-up message. The first telecommunications switch also transmits the SCP query message to the SCP. The method comprises receiving the SCP query message into the SCP, processing the POTS number in the SCP for the call to determine a selected telecommunications switch and a selected connection for the call in response to receiving the SCP query message. An SCP response message is generated in the SCP for the call that identifies the selected telecommunications switch and the selected connection, and the response message is transmitted from the SCP to the first telecommunications switch.

The invention further comprises a system for processing a Plain Old Telephone Service (POTS) number for a call. The system comprises a first telecommunications switch that is operational to receive the call and a set-up message for the call, and that is also operational to generate and transmit a query message for the call in response to receiving the set-up message. The system includes a processing system that is operational to receive the query message, and that is operational to process the POTS number to determine a selected telecommunications switch and a selected connection for the call in response to receiving the query message. The processing system is also operational to generate a response message for the call that identifies and transmits the selected telecommunications switch and the selected connection. A link transmits the query message from the first telecommunications switch to the processing system and transmits the response message from the processing system to the first telecommunications switch. In this system the first telecommunications switch is operational to receive the response message and extend the call in response to receiving the response message.

The invention also comprises A Service Control Point (SCP) for processing a Plain Old Telephone Service (POTS) number for a call. The SCP comprises a front end processor that is operational to receive an SCP query message for the call from a first telecommunications switch and forward the SCP query message. The SCP includes a call processor that is operational to enter a caller information node with a caller telephone number for the call and yield a pointer to a POTS number node. The POTS number node yields a pointer to a destination node. The destination note yields information identifying a selected telecommunications switch and a selected connection. The SCP forwards an SCP response message that identifies the selected telecommunications switch and the selected connection.

Figure 1:
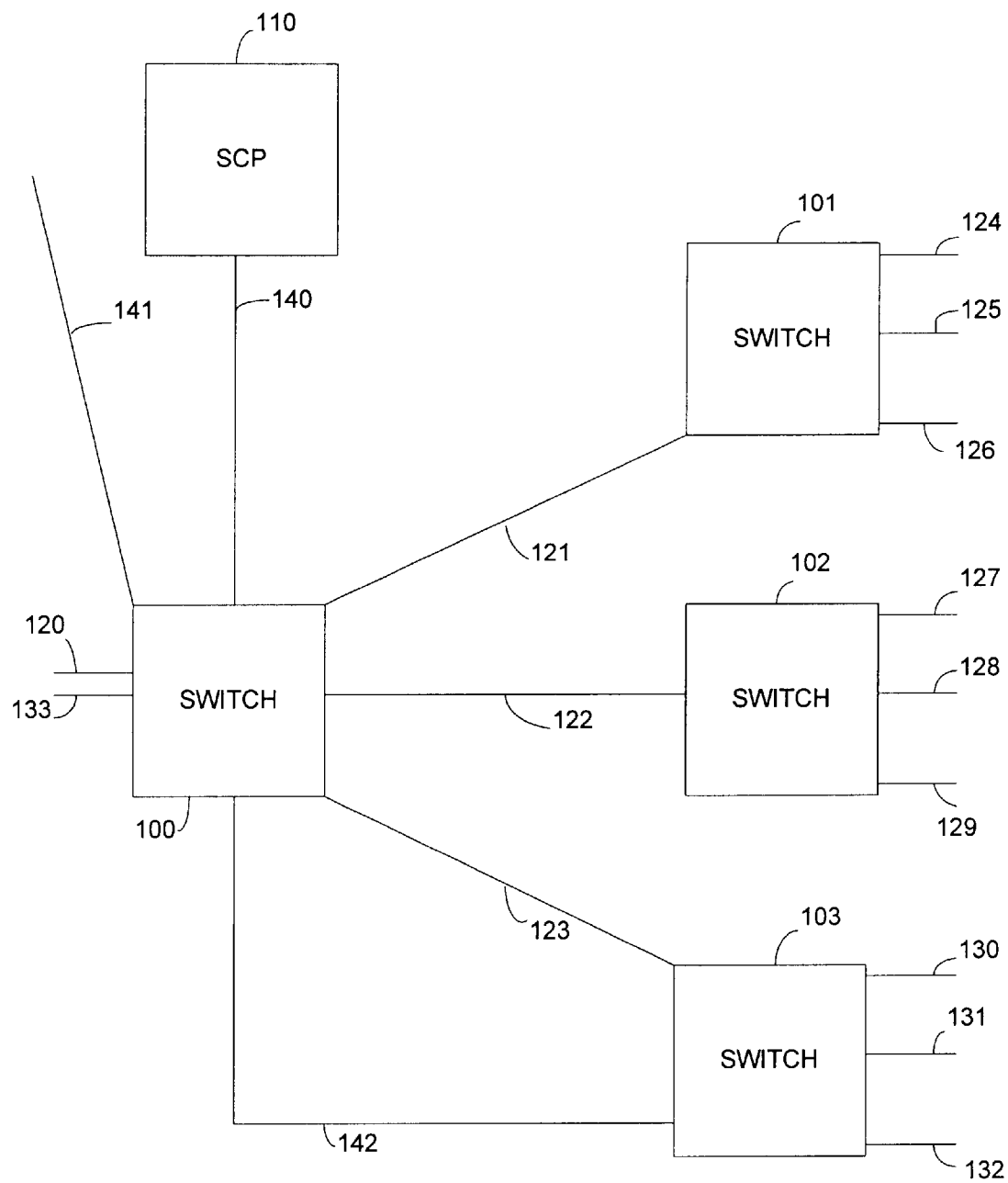
FIG. 1 is a block diagram of a system architecture for a version of the invention.
Figure 2:
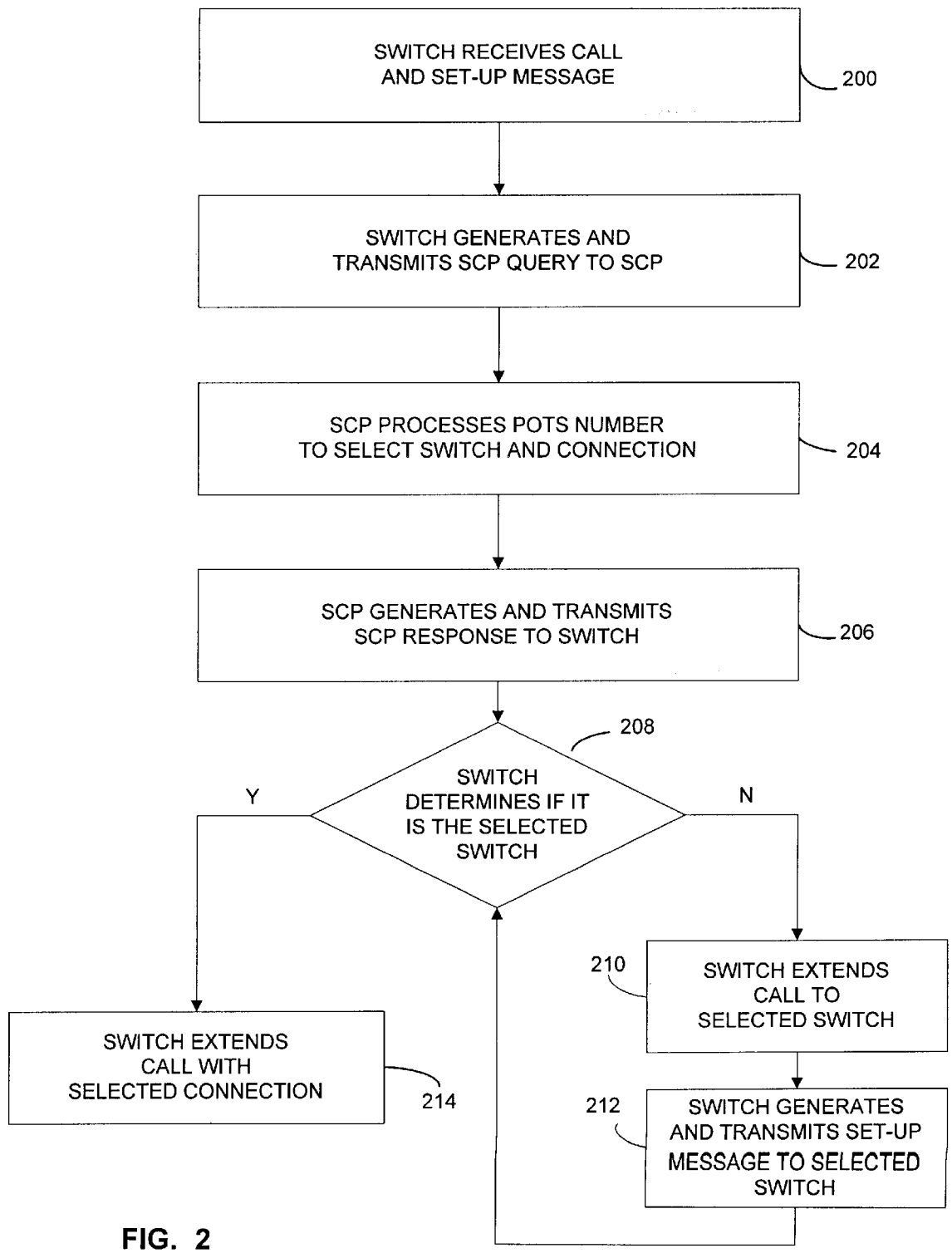
FIG. 2 is a flow diagram of system operation for a version of the invention.

DETAILED DESCRIPTION
System Architecture and Operation—FIGS. 1–2

The invention is a method and system for using processing system to process POTS numbers for calls. The preferred processing system is a Service Control Point (SCP). POTS is a term that is well known in the art and POTS numbers are well known in the art. A prime example of a POTS number is the well known ten-digit home telephone number. POTS numbers include a three digit area code, a three digit exchange, and four more exchange digits. POTS numbers are administered by an industry organization. At present, POTS numbers are 10-digit North America Numbering Plan (NANP) numbers.

FIG. 1 depicts a block diagram of a version of the invention. Switches 100–103 and an SCP 110 is shown. The switch 100 is linked to SCP 110 by link 140. The switch 100 is respectively connected to the switches 101–103 by the connections 121–123. The switch 100 also has a connection 120, a connection 133, and a link 141. The switch 101 has connections 124–126, in addition to connection 121. The switch 102 has connections 127–129, in addition to connection 122. The switch 102 has connections 130–132, in addition to connection 123.

One skilled in the art will appreciate that there are numerous other conventional components in a telecommunications system that are not shown on FIG. 1 for reasons of clarity. For example, the switches 101–103 would be linked to the SCP 110 and the switches 100–103 would typically be linked to a signal transfer point to exchange messages with one another.

The switches 100–103 could be any devices capable of inter-connecting the connections 120–133 in response to messages. Some examples of the switches 100–103 are class 4 switches, ATM switches, or wireless switches. The connections 120–133 could be any medium for transporting information with some examples being DS0 connections, ATM connections, or wireless connections. The SCP 110 is a Service Control Point with one example being the SCP supplied by the Tandem Corporation and configured and operated in accord with the invention. The links 140–141 could be any medium capable of transporting message with one example being a Signaling System #7 (SS7) link. Those skilled in the art will recognize that there are numerous other examples that fall within the scope of the invention, and that the invention is not restricted to the examples listed above. The switches 100–103 and the SCP 110 could be adapted to implement the invention as follows.

FIG. 2 depicts the operation of a version of the invention and is discussed in conjunction with FIG. 1. At step 200, the switch 100 receives a call over the connection 120 and receives a set-up message for the call over link 141. In response to receiving the set-up message, the switch 100 generates an SCP query message and transmits the SCP query to the SCP 110 over the link 140 at step 202. In some embodiments of the invention, the set-up message may include the POTS number for the call. In other embodiments, the SCP 110 may apply special service processing to determine the POTS number for the call. In response to receiving the SCP query message, the SCP 110 processes the POTS number to select one of the switches 100–103 and one of the connections 124–133 for the call at step 204. For this call, the SCP 110 might select the switch 103 and the connection 131. The SCP 110 then generates an SCP response message for the call that identifies the selected switch 103 and the selected connection 131 and transmits the SCP response message to the switch 100 at step 206.

In some embodiments, the SCP 110 will select a prioritized list of connections. The SCP response message will contain the list or a pointer to memory in the selected switch that contains the list. The selected switch can use the first priority connection, but the selected switch is also free to use other connections on the list if needed.

The switch 100 extends the call using information in the SCP response message. This is accomplished by determining if the switch 100 is the selected switch at step 208. In the above example, the switch 103 is the selected switch, so the switch 100 would extend the call to the selected switch 103 over the connection 123 in response to the SCP response message at step 210.

Connection 123 would be identified through a simple table look up to match a switch code in the SCP response with an available connection in the table. Typically, the switch code is only three or four digits and the number of possible switch code entries to search is less than one-hundred. This simple look-up can be readily contrasted with the ten-digit number translation required previously. Not only were there more digits, but there were exponentially more possible number entries to search. As a result, the invention avoids digit translation by using much simpler look up.

The switch 100 would also generate a set-up message that identified the selected switch and the selected connection 131. The switch 100 would transmit the set-up message to the switch 103 over the link 142 at step 212. The selected switch 103 would preferably then perform the processing at step 208. Since the switch 103 is the selected switch, the switch 103 would extend the call over the selected connection 131 in response to the set-up message from the switch 100 at step 214. Importantly, no digit translation or table look-up is even required.

If the SCP 110 had selected the switch 100 and the connection 133 at step 204, then the switch 100 would have determined that it was the selected switch at step 208 and would have extended the call to over the selected connection 133 at step 214.

It should be noted that the switch 100 did not have to process the POTS number to select the next switch. The switch 100 only had to send a query to the SCP 110, and the SCP 110 processed the POTS number to select the next switch 103. The switch 100 was able to extend the call to the selected switch 103 without translating a POTS number or a Location Routing Number (LRN). The selected switch 103 did not have to process the POTS number to select the connection 131. The SCP 110 processed the POTS number to select the connection 131. The switch 103 was able to extend the call to the selected connection 131 without translating the POTS number. As a result, the call was extended from the connection 120 to the selected connection 131 without requiring POTS or LRN number translation in the switches 100–103.

Those skilled in the art will appreciate that all of the switches 100–103 could be linked to the SCP 110 and to each other, but this configuration was not shown for reasons of clarity. In this scenario, calls would enter and exit any of the switches 100–103, and each of the switches 100–103 would use the SCP 110 for POTS number processing.

Advantageously, the above-described POTS number processing occurs in the SCP 110. SCP 110 provides a centralized repository for the POTS number processing logic. If this POTS number processing logic requires a modification, the SCP 110 would be altered, but the logic in the switches 100–103 could be left alone. This is more efficient than altering logic in the four switches 100–103. Those skilled in the art are aware that the SCP 110 is an easier platform to modify than are the switches 100–103.

Figure 3:
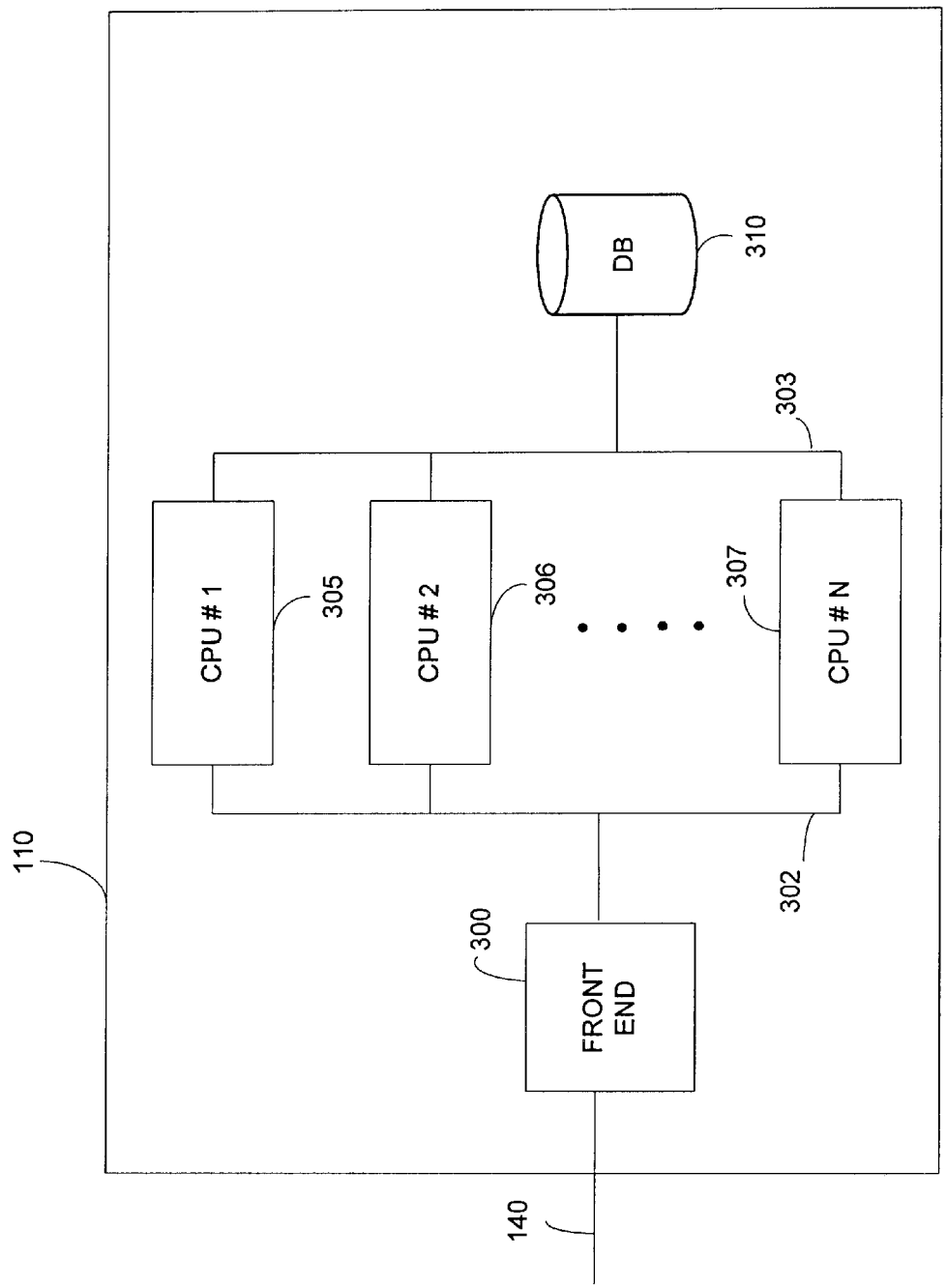
FIG. 3 is a block diagram of an SCP architecture for a version of the invention.
Figure 4:
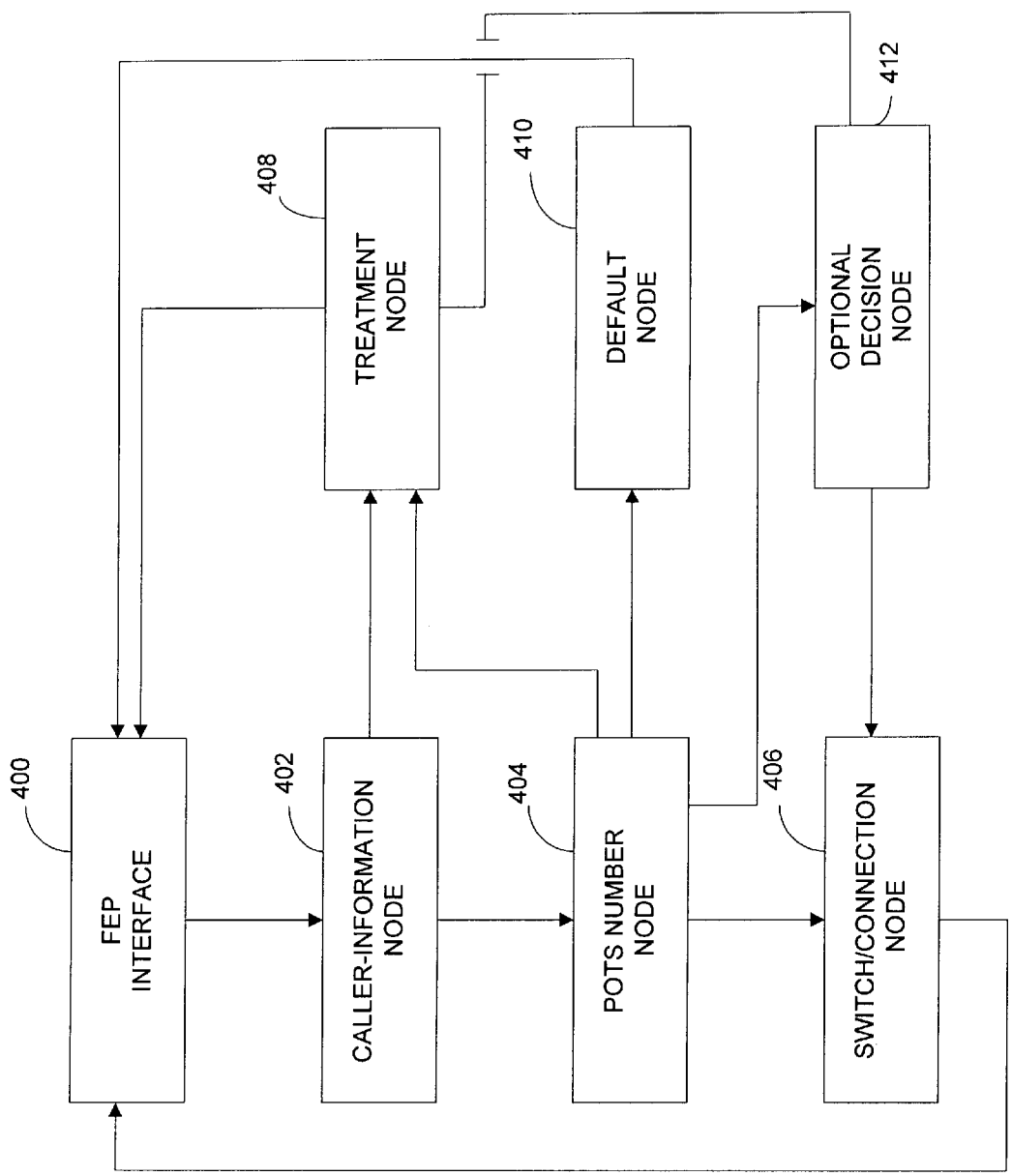
FIG. 4 is a logic diagram for SCP operation for a version of the invention.

SCP Architecture and Operation—FIGS. 3–4

FIG. 3 depicts an architecture for the SCP 110 in some embodiments of the invention. The SCP 110 is a processing system that can be distributed among multiple processors or integrated within a single processor. The SCP 110 is comprised of a front end processor (FEP) 300, the central processing units (CPUs) 305–307, the database (DB) 310, and links 302–303. The FEP 300 is connected to the link 140 and to the link 302. The CPUs 305–307 are connected to links 302–303. The DB 310 is connected to the link 303. An example of FEP 300 is the Tandem ST-2000. The FEP 300 includes SS7 message transfer part functionality and SS7 signaling connection control part functionality that is known in the art. Multiple CPUs are depicted on FIG. 3 although only CPUs 305–307 are shown for clarity. An example of the CPUs 305–307, the link 303, and the DB 310 is the Tandem Himalaya loaded with the Tandem Guardian operating system, in addition to database management software and various conventional utilities. The link 302 could be any data link for interfacing processors.

The FEP 300 exchanges messages with the switch 100 over the link 140. Although they are not shown for clarity, the FEP 300 could handle numerous such links as well. The CPUs 305–307 receive the messages from the switch 100 through the FEP 300. The messages to the SCP 110 could include POTS numbers, or the CPUs 305–307 might apply special service logic to the messages to determine the POTS numbers. The CPUs 305–307 perform the POTS number processing. The CPUs 305–307 access the DB 310 to support the POTS number processing. The CPUs 305–307 forward the SCP response messages to the FEP 300 for final processing and transfer to the switch 100 over link 140.

In some embodiments, particular CPUs in the SCP 110 can be dedicated to POTS number processing, and other CPUs can be left for special services, such as "800" type calls, calling card calls, and private network calls. For example, the CPU 306 could be dedicated to POTS number processing. When an SCP query message arrived for POTS number processing, the FEP 300 would provide the call message to the CPU 306. When an SCP query message arrived for special service call, the FEP 300 would provide the call message to CPU 305 or 307. The CPU 305 or 307 would apply the special service logic to determine the POTS number for the call and would use the Inter-Processor Communications Protocol (IPCP) to send a message with the POTS number to the CPU 306. The CPU 306 would process the POTS number to select the switch and connection, and would then respond to the FEP 300. The FEP 300 could allocate messages between POTS CPUs and non-POTS CPUs using a service discrimination function.

FIG. 4. depicts the operation of the POTS number processing logic in CPU 305 of the SCP 110 in some embodiments of the invention. POTS number processing logic in other CPUs preferably would be similar. The CPU 305 uses the FEP interface 400 to exchange messages with the FEP 300. The CPU 305 process the messages from the FEP interface 400 by using nodes. A node is a data structure that can be entered with information or pointers. The CPU 305 processes the data structure until the node yields either the desired information or a pointer to another node.

The CPU 305 first enters a caller information node 402 with the caller information from the query message. The caller information node 402 can be used to partition callers into logical groupings. For example, callers who subscribe to a particular service provider could be grouped together in the caller information node 402. The caller information node 402 can partition callers by their telephone number, by a circuit used to place the call, by the method of carrier selection, or by a type of device used to place the call. In addition, callers who are not desired can be pointed to the treatment node 408 to reject the call attempt. The caller information node 402 will either yield a pointer to the POTS number node 404 or to the treatment node 408.

The POTS number node 404 is entered by using a pointer to identify a segment of the data structure. This pointer is referred to as a tree ID and the segment is referred to as a tree. The particular tree is entered by using the POTS number. The POTS number node 404 yields either a pointer to the treatment node 408, a pointer to the default node 410, a pointer to the optional decision node 412, or a pointer to the switch/connection node 406. The switch/connection node 406 yields the selected switch and the selected connection for the call. The CPU 305 sends the SCP response message identifying the selected switch and the selected connection to the FEP 300 using the FEP interface 400.

The treatment node 408 is used to reject calls or apply any treatment for the given call profile. The treatment node 408 produces an SCP response message for FEP interface 400. The default node 410 is used to provide default connections or handle mistakes in the data structures. For example, calls could be routed to an operator using the default node 410. The default node 410 produces an SCP response message for the FEP interface 400. The optional decision node 412 is used to apply additional logic to the call as would be appreciated by those skilled in the art. One example of such additional logic would be processing the call based on a time of day. The optional decision node 412 points to the switch/connection node 406 and the treatment node 408.

POTS Call Example—FIGS. 1–4

A specific embodiment is discussed below, but it should be noted that the invention is not limited to this specific embodiment. In this embodiment, the switches 100–103 are DMS-250 switches provided by Nortel, and the SCP 100 is a Himalaya SCP provided by Tandem. The connections 120–133 are DS3 connections with embedded DS0 connections. The links 140–142 are SS7 links.

The switch 100 receives a call over a DS0 embedded within the DS3 represented by the connection 120. The switch 100 also receives an SS7 Initial Address Message (IAM) related to the call over the link 141. The IAM identifies the DS0, the caller telephone number, and the called telephone number. The called telephone number is a POTS number. In response to receiving the IAM, the switch 100 validates the caller telephone number to determine if the caller should be allowed to place the call. The switch 100 also verifies the called POTS number to determine if the number is appropriate. For example, the number of digits and the format of the number might be verified. The switch 100 then triggers because of the POTS number and generates an SCP query for the call. A trigger is an instruction in the logic of the switch 100 to invoke the SCP 110. The SCP query is an SS7 Transaction Capabilities Application Part (TCAP) message that identifies the caller telephone number and the called POTS number. The switch 100 transmits the TCAP query to the SCP 110 over the link 140.

The SCP 110 processes the TCAP query as discussed with respect to FIGS. 3–4. The SCP 110 typically processes the POTS number to select a telecommunications switch and a connection. In this example, the selected connection is a DS3 connection, but it could also be a DS1 or a DS0 connection embedded within the DS3 connection. For example, the SCP may select the telecommunications switch 103 and the DS3 within connection 131. The SCP 110 generates a Transaction Capabilities Application Part (TCAP) response message that identifies the selected telecommunications switch 103 and the selected DS3 within connection 131 in a destination parameter.

The telecommunications switch 100 processes the TCAP response message by determining if it is the selected switch. If the telecommunications switch 100 is the selected switch, then the call is extended over the selected connection. Since, the telecommunications switch 100 is not the selected switch, the call is extended to the selected telecommunications switch 103 over DS3 within connection 123. The DS3 connections is identified by matching the code for the selected switch with an entry in a simple table containing the possible switch codes and their related connections. The DS3 connection 123 is identified by the switch 100 without translating a POTS number or an LRN.

The telecommunications switch 100 also generates an IAM that identifies the selected telecommunications switch 103 and the selected DS3 within connection 131 in a generic address parameter and a generic digits parameter. The telecommunications switch 100 sends the IAM to the selected switch 103 over the link 142. The selected telecommunications switch 103 extends the call over the selected DS3 connection 131 in response to the IAM. The selected telecommunications switch 103 is not required to translate a POTS number or an LRN to identify the DS3 connection 131.

Special Service and POTS Call Example—FIGS. 1–4

A specific embodiment is discussed below, but it should be noted that the invention is not limited to this specific embodiment. In this embodiment, the switches 100–103 are DMS-250 switches provided by Nortel, and the SCP 100 is a Himalaya SCP provided by Tandem. The connections 120–133 are DS3 connections with embedded DS0 connections. The links 140–142 are SS7 links.

In this example, the call is a special service call placed using an "800" type number. "800" type calls are a well known form of special service calls, but other special service calls are also applicable to the invention, such as "900" calls, virtual network calls, and calling card calls.

The switch 100 receives a call over a DS0 embedded within the DS3 represented by the connection 120. The switch 100 also receives an SS7 Initial Address Message (IAM) related to the call over the link 141. The IAM identifies the DS0, the caller telephone number, and the called telephone number. The called telephone number is an "800" type number. In response to receiving the IAM, the switch 100 validates the caller telephone number to determine if the caller should be allowed to place the call, although caller validation can be optional for "800" type calls. The switch 100 also verifies the called "800" type number to determine if the number is appropriate. For example, the number of digits and the format of the number might be verified. The switch 100 then triggers because of the special service call indicated by the "800" type number and generates an SCP query for the call. A trigger is an instruction in the logic of the switch 100 to invoke the SCP 110. The SCP query is an SS7 Transaction Capabilities Application Part (TCAP) message that identifies the caller telephone number and the called "800" type number. The switch 100 transmits the TCAP query to the SCP 110 over the link 140.

The SCP 110 processes the TCAP query as discussed with respect to FIGS. 3–4. The SCP 110 applies the special service logic to the call to determine a POTS number. The application of special service logic in an SCP to determine a POTS number is well known. In this example, the SCP 110 processes the "800" type number to determine a POTS number. The SCP 110 may dedicate processors to POTS number processing, and the special service processors would use the Inter-Processor Communication Protocol to invoke the POTS number processors. The SCP 110 then processes the POTS number to select a telecommunications switch and a DS3 trunk connection. For example, it may select the telecommunications switch 103 and the DS3 connection 131. The SCP 110 generates a Transaction Capabilities Application Part (TCAP) response message that identifies the selected telecommunications switch 103 and the selected DS3 connection 131 in a destination parameter.

The telecommunications switch 100 processes the TCAP response message by determining if it is the selected switch. If the telecommunications switch 100 is the selected switch, the call is extended over the selected connection. Since, the telecommunications switch 100 is not the selected switch, the call is extended to the selected telecommunications switch 103 over DS0 connection 123. As discussed above, the telecommunications switch 100 is not required to translate a ten digit POTS number or LRN. The telecommunications switch 100 also generates an IAM that identifies the selected telecommunications switch 103 and the selected DS3 connection 131 in a generic address parameter and a generic digits parameter. The telecommunications switch 100 sends the IAM to the selected switch 103 over the link 142. The selected telecommunications switch 103 extends the call over the selected DS3 connection 131 in response to the IAM. The selected telecommunications switch 103 is not required to translate a POTS number or an LRN to identify the DS3 connection 131.

Figure 5:
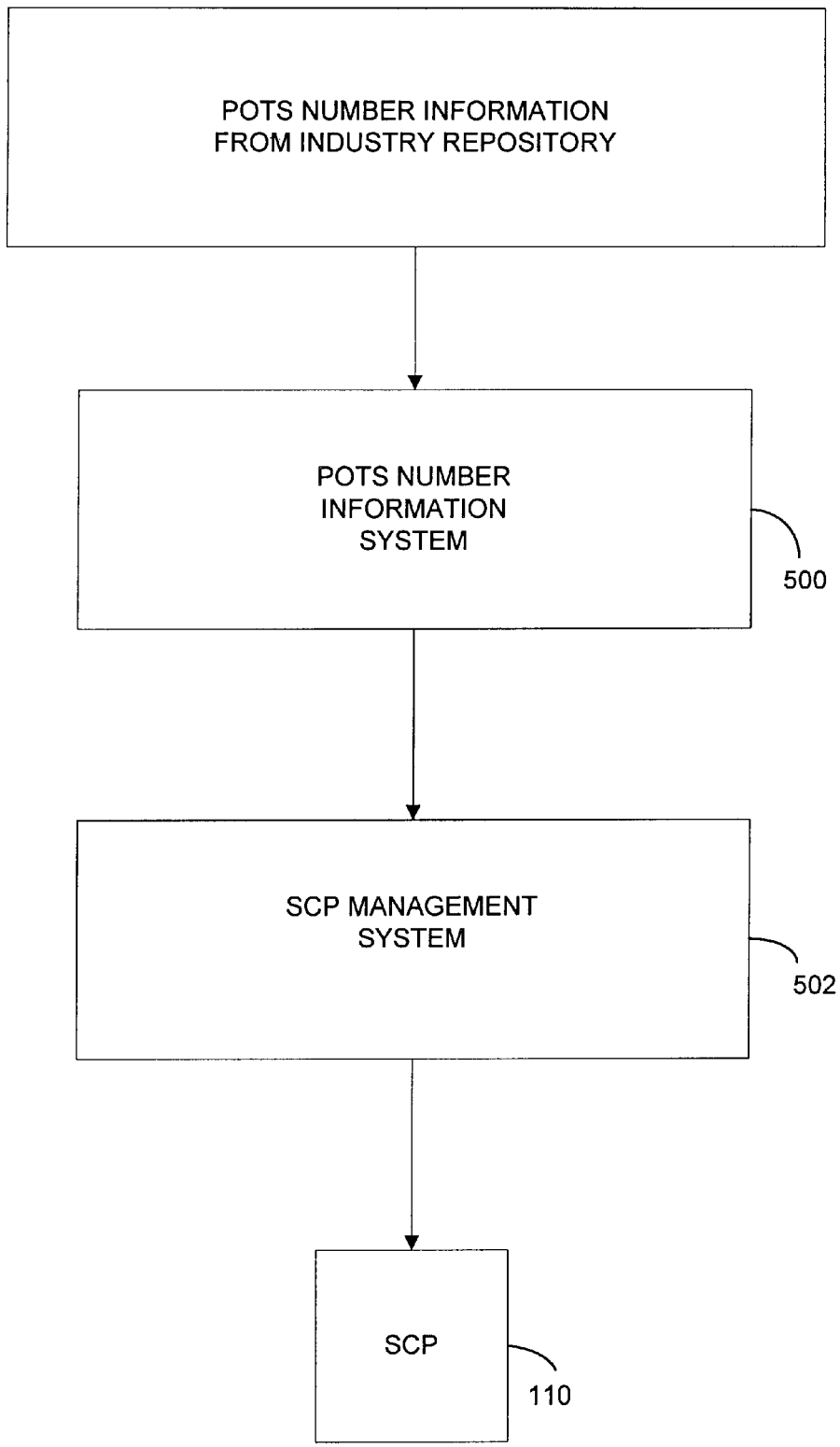
FIG. 5 is a block of an SCP support system in a version of the invention.
Figure 6:
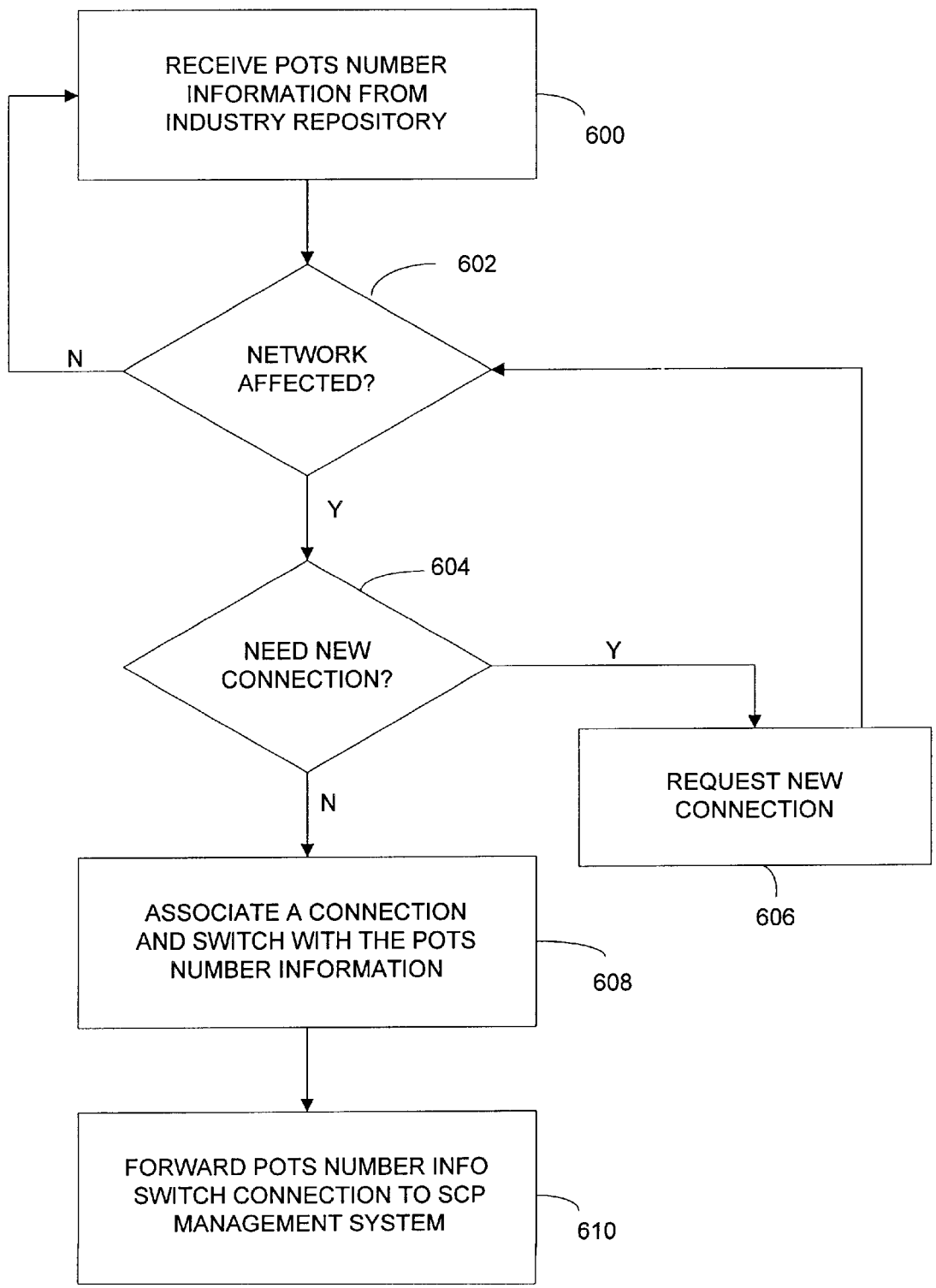
FIG. 6 is a logic diagram for an SCP support system in a version of the invention.

SCP Support System—FIGS. 5–6

FIG. 5 depicts an SCP support system for use in some embodiments of the invention. Shown are the POTS number information system 500, the SCP management system 502, and the SCP 110. The POTS number information system 500 receives information about new POTS numbers from an industry repository of POTS number information. The POTS information is typically new area codes and exchanges. At present, this repository is administered by a Bellcore system referred to as the Local Exchange Routing Guide (LERG). The POTS number information system 500 would process the POTS number information and associate a connection and switch with the POTS number information. Typically, this would entail assigning a connection to a new area code or exchange. The POTS number information, the identity of the connection, and the identity of the switch would be provided to the SCP management system 502. SCP management systems are known in the art. The SCP management system 502 manages the SCP 110, and in particular, it populates the nodes in the SCP 110 with data. The SCP management system 502 would then load the POTS number information, the connection identity, and the switch identity into the appropriate nodes of the SCP 110. The connection identity and the switch identity would be loaded into the switch/connection node 406 and the POTS number information would be loaded into the appropriate tree of the POTS number node 404. The POTS number information in the POTS number node 404 would point to the associated connection and switch in the switch/connection node 406.

FIG. 6 depicts the logic of the POTS number information system 500 for use in some embodiments of the invention. The POTS number information is received from the industry repository at step 600. At step 602, it is determined if the network is affected by the new POTS number information. If it is not, the system resets to step 600. If the network is affected, it is determined if a new connection is needed at step 604. If a new connection is needed, a new connection is requested at step 606 and the system resets to step 604 until the connection is installed. If a new connection is not needed, or if the new connection has been installed, then a connection and a switch are associated with the POTS number information at step 608. Typically, this entails assigning a switch and connection to a new area code or a new exchange. The POTS number information, the identity of the connection, and the identity of the switch are forwarded to the SCP management system 502 at step 610. After the data is subsequently loaded into the nodes of the SCP 110, the telecommunications switches 100–103 can use the SCP 110 to process calls placed to the new POTS numbers.

The invention places POTS number processing logic in an SCP for use by telecommunications switches. The SCP is a shared resource, so multiple telecommunications switches can use the same POTS number processing logic. This means the logic can be modified or upgraded at the SCP platform instead of multiple switches. SCPs are typically easier to access and work on than are telecommunications switches. The SCP is used to process POTS number to select a switch and a connection for extension of the call. The use of SCPs to process POTS numbers significantly reduces the amount of call processing logic that is required in a telecommunications switch. POTS number processing logic in an SCP can be readily accessed and is centrally located within a network. Placing POTS number processing logic in the SCP is more efficient and cost-effective than placing this logic in a telecommunications switch.

Those skilled in the art can appreciate variations of the above-described embodiments that fall within the scope of the invention. As a result, the invention is not limited to the specific embodiments discussed above, but only by the following claims and their equivalents.

What is claimed is:

1. A method of processing a Plain Old Telephone Service (POTS) number for a call using a Service Control Point (SCP) processing system, the method comprising:

receiving the call and a set-up message for the call into a first telecommunications switch;

in the first telecommunications switch, generating a query message for the call in response to receiving the set-up message;

transmitting the query message from the first telecommunications switch and receiving the query message into the SCP processing system;

in the SCP processing system, processing the POTS number for the call to determine a selected telecommunications switch and a selected connection in response to receiving the query message;

in the SCP processing system, generating a response message for the call that identifies the selected telecommunications switch and the selected connection;

transmitting the response message from the SCP processing system and receiving the response message into the first telecommunications switch; and in the first telecommunications switch, extending the call in response to receiving the response message.

2. The method of claim 1 wherein the first telecommunications switch does not translate the POTS number to extend the call.

3. The method of claim 1 wherein the first telecommunications switch does not translate a Local Routing Number (LRN) to extend the call.

4. The method of claim 1 wherein the first telecommunications switch generates the query message for the call in response to receiving the POTS number in the set-up message.

5. The method of claim 1 wherein the query message includes the POTS number.

6. The method of claim 1 wherein processing the POTS number for the call in the processing system further comprises:

entering a POTS number node with the POTS number for the call and a pointer to the POTS number node, and yielding a pointer to a destination node; and entering the destination node with the pointer to the destination node and yielding information identifying the selected telecommunications switch and the selected connection.

7. The method of claim 6 further comprising entering a caller information node in the processing system with caller information for the call in response to receiving the query message and yielding the pointer to the POTS number node.

8. The method of claim 7 wherein the caller information node is logically partitioned by service provider.

9. The method of claim 7 wherein the caller information node is logically partitioned by caller number.

10. The method of claim 1 further comprising applying special service logic in the processing system to determine the POTS number for the call in response to receiving the query message.

11. The method of claim 10 wherein applying the special service logic comprises applying "800" type service logic.

12. The method of claim 10 wherein applying the special service logic comprises applying "900" service logic.

13. The method of claim 10 wherein applying the special service logic comprises applying calling card service logic.

14. The method of claim 10 wherein applying the special service logic comprises applying virtual network service logic.

15. The method of claim 1 wherein generating the response message in the processing system for the call further comprises generating a Transaction Capabilities Application Part (TCAP) message that identifies the selected telecommunications switch and the selected connection in a destination parameter.

16. The method of claim 1 wherein extending the call in the first telecommunications switch further comprises extending the call from the first telecommunications switch to the selected telecommunications switch in response to receiving the response message.

17. The method of claim 16 wherein the set-up message for the call is a first set-up message and wherein the method further comprises:

in the first telecommunications switch, generating a second set-up message for the call that identifies the selected connection in response to receiving the response message;

transmitting the second set-up message from the first telecommunications switch and receiving the second set-up message into the selected telecommunications switch; and in the selected telecommunications switch, extending the call using the selected connection in response to receiving the second set-up message.

18. The method of claim 17 wherein the selected telecommunications switch does not translate the POTS number to extend the call.

19. The method of claim 17 wherein the selected telecommunications switch does not translate a Location Routing Number (LRN) to extend the call.

20. The method of claim 17 wherein generating the second set-up message in the first telecommunications switch further comprises generating an Initial Address Message (IAM) that identifies the selected telecommunications switch and the selected connection in a generic address parameter and a generic digits parameter.

21. The method of claim 1 wherein the first telecommunications switch and the selected telecommunications switch are the same and wherein extending the call in the first telecommunications switch further comprises extending the call from the telecommunications switch using the selected connection in response to receiving the response message.

22. A method of processing a Plain Old Telephone Service (POTS) number for a call using a Service Control Point (SCP), wherein a first telecommunications switch receives the call and a set-up message for the call, wherein the first telecommunications switch generates an SCP query message for the call in response to receiving the set-up message, and wherein the first telecommunications switch transmits the SCP query message to the SCP, the method comprising:

receiving the SCP query message into the SCP;

in the SCP, processing the POTS number for the call to determine a selected telecommunications switch and a selected connection for the call in response to receiving the SCP query message;

in the SCP, generating an SCP response message for the call that identifies the selected telecommunications switch and the selected connection; and transmitting the SCP response message from the SCP to the first telecommunications switch.

23. The method of claim 22 wherein the SCP query message includes the POTS number.

24. The method of claim 22 wherein processing the POTS number in the SCP further comprises:

entering a POTS number node with the POTS number for the call and a pointer to the POTS number node, and yielding a pointer to a destination node; and entering the destination node with the pointer to the destination node and yielding information identifying the selected telecommunications switch and the selected connection.

25. The method of claim 24 further comprising entering a caller information node in the SCP with caller information for the call in response to receiving the SCP query message, and yielding the pointer to the POTS number node.

26. The method of claim 24 wherein the caller information node is logically partitioned by service provider.

27. The method of claim 24 wherein the caller information node is logically partitioned by caller number.

28. The method of claim 22 wherein processing the POTS number in SCP further comprises applying special service logic in the SCP to determine the POTS number in response to the SCP query message.

29. The method of claim 28 wherein applying the special service logic comprises applying "800" type service.

30. The method of claim 28 wherein applying the special service logic comprises applying "900" service logic.

31. The method of claim 28 wherein applying the special service logic comprises applying calling card logic.

32. The method of claim 28 wherein applying the special service logic comprises applying virtual network service logic.

33. The method of claim 22 wherein generating the SCP response message in the SCP for the call further comprises generating the Transaction Capabilities Application Part (TCAP) message that identifies the selected telecommunications switch and the selected connection in a destination parameter.

34. The method of claim 22 wherein at least one processor within the SCP is dedicated to POTS number processing and at least one processor within the SCP is dedicated to special service call processing.

35. The method of claim 34 wherein special service call processor communicates with the dedicated POTS number processor using the Inter-Processor Communications Protocol.

36. The method of claim 22, further comprising:

before the call is received, receiving POTS number information into a POTS number administration system;

in the POTS number administration system, processing the POTS number information to associate the selected connection and the selected switch with the POTS number information; and loading data associating the POTS number information with the selected connection and the selected switch into the SCP.

37. The method of claim 36 where processing POTS number information comprises assigning the selected connection and the selected switch to an area code.

38. The method of claim 36 wherein processing the POTS number information comprises assigning the selected connection and the selected switch to an exchange.

39. A system for processing a Plain Old Telephone Service (POTS) number for a call, the system comprising:

a first telecommunications switch that is operational to receive the call and a set-up message for the call, that is operational to generate a query message for the call in response to receiving the set-up message, and that is operational to transmit the query message;

a processing system that is operational to receive the query message, that is operational to process the POTS number to determine a selected telecommunications switch and a selected connection for the call in response to receiving the query message, that is operational to generate a response message for the call that identifies the selected telecommunications switch and the selected connection, and that is operational to transmit the response message from the processing system;

a link that is operational to transmit the query message from the first telecommunications switch to the processing system and to transmit the response message from the processing system to the first telecommunications switch; and wherein the first telecommunications switch is operational to receive the response message and extend the call in response to receiving the response message.

40. The system of claim 39 wherein the processing system is a Service Control Point (SCP).

41. The system of claim 39 wherein the first telecommunications switch is operational to extend the call without translating the POTS number.

42. The system of claim 39 wherein the first telecommunications switch is operational to extend the call without translating a Location Routing Number (LRN).

43. A Service Control Point (SCP) for processing a Plain Old Telephone Service (POTS) number for a call that comprises:

a front end processor that is operational to receive an SCP query message for the call from a first telecommunications switch and forward the SCP query message;

a call processor that is operational to enter a caller information node with a caller telephone number for the call and yield a pointer to a POTS number node, that is operational to enter the POTS number node with the pointer to the POTS number node and the POTS number for the call and yield a pointer to a destination node, that is operational to enter the destination node with the pointer to the destination node yield information identifying a selected telecommunications switch and a selected connection, and that is operational to forward an SCP response message that identifies the selected telecommunications switch and the selected connection;

a link that is operational to transmit the SCP query message from the front end processor to the call processor and that is operational to transmit the SCP response from the call processor to the front end processor; and wherein the front end processor is operational to transmit the SCP response message for the call to the first telecommunications switch.

44. The SCP of claim 43 wherein the caller information node is logically partitioned by service provider.

45. The SCP of claim 43 wherein the caller information node is logically partitioned by caller number.

46. A Service Control Point (SCP) for processing a Plain Old Telephone Service (POTS) number for a call that comprises:

a front end processor that is operational to receive an SCP query message for the call from a first telecommunications switch and forward the SCP query message;

a special service call processor that is operational to apply special service logic to the call to determine the POTS number for the call in response to the SCP query message;

a POTS number processor that is operational to enter a POTS number node with a pointer to the POTS number node and the POTS number for the call and yield a pointer to a destination node, that is operational to enter the destination node with the pointer to the destination node yield information identifying a selected telecommunications switch and a selected connection, and that is operational to forward an SCP response message that identifies the selected telecommunications switch and the selected connection;

links that are operational to transmit the SCP query message from the front end processor to the special service call processor, to transmit the POTS number from the special service call processor to the POTS number processor, and to transmit the SCP response from the POTS number processor to the front end processor; and wherein the front end processor is operational to transmit the SCP response message for the call to the first telecommunications switch.

47. The SCP of claim 46 wherein the special service call processor is operational to communicate with the POTS number processor using the Inter-Processor Communications Protocol.

48. The SCP of claim 46 wherein the special service logic comprises "800" type service logic.

49. The SCP of claim 46 wherein the special service logic comprises "900" service logic.

50. The SCP of claim 46 wherein the special service logic comprises calling card service logic.

51. The SCP of claim 46 wherein the special service logic comprises virtual network service logic.

* * * * *